United States Patent
Matthews

(10) Patent No.: US 9,297,699 B1
(45) Date of Patent: *Mar. 29, 2016

(54) METHOD FOR USING THE MOON'S THERMAL OUTPUT TO TRACK CALIBRATION DRIFTS IN INSTRUMENTS ON BOARD SATELLITES OBSERVING THE EARTH

(71) Applicant: EXELIS, INC., McLean, VA (US)

(72) Inventor: Grant Matthews, Fort Wayne, IN (US)

(73) Assignee: Exelis, Inc., Herndon, VA (US)

( * ) Notice: Subject to any disclaimer, the term of this patent is extended or adjusted under 35 U.S.C. 154(b) by 495 days.

This patent is subject to a terminal disclaimer.

(21) Appl. No.: 13/795,860

(22) Filed: Mar. 12, 2013

Related U.S. Application Data

(60) Provisional application No. 61/617,215, filed on Mar. 29, 2012.

(51) Int. Cl.
   *G01J 5/02* (2006.01)

(52) U.S. Cl.
   CPC .......................................... *G01J 5/02* (2013.01)

(58) Field of Classification Search
   CPC .......... G01J 5/02; G01J 5/52; G01J 2005/528
   See application file for complete search history.

(56) References Cited

U.S. PATENT DOCUMENTS

| | | | |
|---|---|---|---|
| 3,519,823 A | 7/1970 | Heller et al. | |
| 5,218,416 A | 6/1993 | Haring et al. | |
| 5,659,168 A | 8/1997 | Dey et al. | |
| 5,672,866 A | 9/1997 | Messina | |
| 6,111,640 A | 8/2000 | Hedman et al. | |
| 6,241,192 B1* | 6/2001 | Kondo et al. | 244/158.4 |
| 6,278,100 B1 | 8/2001 | Friedman et al. | |
| 6,455,830 B1 | 9/2002 | Whalen et al. | |
| 7,166,825 B1 | 1/2007 | Smith et al. | |
| 7,321,654 B2 | 1/2008 | Cho et al. | |
| 7,482,572 B1 | 1/2009 | Galvin | |
| 8,217,326 B1* | 7/2012 | Matthews | 250/203.1 |
| 8,258,449 B1 | 9/2012 | Matthews | |

OTHER PUBLICATIONS

Sun et al. Radiometric stability monitoring of the MODIS reflective solar bands using the Moon, Metrologia vol. 40 (Feb. 2003), pp. S85-S88.*

Matthews, Grant, Celestial Body Irradiance Determination From an Underfilled Satellite Radiometer: Application to Albedo and Thermal Emission Measurements of the Moon Using Ceres, Applied Optics; vol. 47, No. 27, Sep. 20, 2008.

(Continued)

*Primary Examiner* — David Porta
*Assistant Examiner* — Shun Lee
(74) *Attorney, Agent, or Firm* — RatnerPrestia

(57) ABSTRACT

A method of calibrating a spectrometer, while orbiting the Earth, includes the steps of (a) determining a period of time in which the Moon is within a field of view (FOV) of the spectrometer and (b) stopping the FOV of the spectrometer during this period of time. During this period of time, multiple "free views" of the Moon are available, in which lunar IR intensities may be received by the spectrometer that are comparable to intensity levels obtained from an internal calibration test (ICT) on a satellite. The method measures the IR radiance from the Moon during this period of time. After filtering the lunar IR radiances by an integral function, the spectrometer is calibrated using the "free views" as a benchmark.

14 Claims, 7 Drawing Sheets

AZIMUTH ROTATION AT FIXED ELEVATION

(56) References Cited

OTHER PUBLICATIONS

Matthews, Grant, "In-Flight Spectral Characterization and Calibration Stability Estimates for the Clouds and the Earth's Radiant Energy System (CERES)", Journal of Atmospheric and Oceanic Technology, vol. 26, Sep. 2009.

Earth Online, "Sciamachy", https://earth.esa.int/web/guest/missions/esa-operational-eo-missions/envisat/instruments/sciamachy, as shown in www.archive.org ("Wayback Machine") page of Feb. 17, 2013, printed Apr. 27, 2015.

Wikipedia, the free encyclopedia, "Advance very High Resolution Radiometer", http://en.wikipedia.org/wiki/Advanced_Very_High_Resolution_Radiometer, as shown in www.archive.org ("Wayback Machine") page of Feb. 5, 2013, printed Apr. 27, 2015.

"NOAA's Comprehensive Large Array-data steward-ship System," http://www.class.ngdc.noaa.gov/saa/products/search?datatype_family=IASI, as shown in www.archive.org ("Wayback Machine") page of Feb. 14, 2013, printed Apr. 27, 2015.

From Wikipedia, the free encyclopedia, "Atmospheric Infrared Sounder", https://en.wikipedia.org/wiki/Atmospheric_Infrared_Sounder, as shown in www.archive.org ("Wayback Machine") page of Aug. 14, 2012, printed Apr. 27, 2015.

\* cited by examiner

AZIMUTH ROTATION AT
FIXED ELEVATION

METHOD FOR USING THE MOON'S THERMAL OUTPUT TO TRACK CALIBRATION DRIFTS IN INSTRUMENTS ON BOARD SATELLITES OBSERVING THE EARTH

RELATED APPLICATION

The present application is related to U.S. patent application Ser. No. 12/542,885, now U.S. Pat. No. 8,258,449, which is incorporated herein by reference in its entirety.

TECHNICAL FIELD

The present invention relates, in general, to the field of radiometry and, more specifically, to systems and methods for radiometric calibration of climate monitoring remote sensors in space.

BACKGROUND OF THE INVENTION

The Earth's climate is changing and there is a consensus that the dominant cause of this is emissions of greenhouse gases (GHG) like CO2 by mankind. Computer climate models are predicting that temperatures will be rising over 20-50 years given GHG increases.

Climate models, however, are far from perfect. The biggest uncertainty in computer models today is how they simulate the physics/chemistry of what is called cloud feedback. Generally, as CO2 GHG warms the planet, by increasing the greenhouse effect, will the planet get more clouds, less clouds, or different clouds? Will the cloud changes enhance or reduce global warming (i.e. because clouds both cool the Earth by reflecting sunlight and warm by trapping infra-red in space)? Presently, climatologists are not sure whether the net effect is to enhance positive feedback or reduce negative feedback, the cloud coverage and how much the cloud feedbacks will amplify the warming.

In order to reduce the total uncertainty range in climate change predictions there is a need to ensure the models are correctly simulating how clouds are responding with feedback and hence forcing the climate in one course or another.

It will be appreciated, however, that the size of cloud feedback is very small. For example, it is on the order of less than watt/meter$^2$ change of energy over only a 1° C. temperature change. This means that the sensors observing climate changes over the Earth have to be very stable. Since these sensors are not perfect, they must be calibrated to an absolute accuracy of 0.3% and a calibration stability of 0.1% per decade.

Maintaining calibration of climate data records (CDRS) is challenging due to many reasons. For example, optics can be subject to degradation of up to 30% in the UV, often due to contamination. Many existing instruments do not have stable on-board calibration sources in the UV-visible region and establishing traceability to NIST standards for solar wavelengths is difficult. On-board blackbodies have also been seen to drift in their thermal output to extents not reflected by their temperature sensors.

It will be appreciated that even if a perfect instrument could be launched to monitor the Earth, it would still take nearly two decades to detect the small 0.6% size of cloud feedback. So a launch of a perfect instrument like CLARREO would still not provide an answer before 2040 (CLARREO was a $1 billion mission being designed to make near perfect measurements that was cancelled due to budget cuts).

As will be explained, the present invention provides methods for calibrating existing instruments on-board various satellites that orbit the Earth to measure its albedo and thermal infra-red output to space. The methods of the present invention are inexpensive compared to launching new instruments that are "near perfect." In addition, by calibrating existing instruments, trends in climate changes may become known within ten years, rather than the thirty years that would be required for the launching of a new instrument (10 years of planning plus 20 years of observable data). By correcting the calibration of an existing instrument, its data may be corrected back into the past to the time of its launch. Thus, 20 years of observable data may be available much sooner.

SUMMARY OF THE INVENTION

To meet this and other needs, and in view of its purposes, the present invention provides a method of calibrating a spectrometer orbiting the Earth. The method includes the steps of:

(a) imaging the Earth, using the spectrometer, for long-term observations of the Earth's albedo;

(b) periodically imaging the Moon, using the spectrometer, for short-term observations of the Moon's albedo; and (c) calibrating the spectrometer based on the short-term observations of the Moon's albedo.

Periodically imaging the Moon includes the steps of:

(i) determining a period of time during which the Moon is viewable by the spectrometer, (ii) temporarily stopping imaging of the Earth; and (iii) beginning to image the Moon, during the period of time.

The method includes the step of:

(d) commanding the spectrometer to stop imaging the Earth and begin imaging the Moon. The commanding step is provided by uploading a program to the spectrometer to execute the command.

Periodically imaging the Moon includes the steps of:

(i) viewing the Moon during multiple periods, wherein each period provides a short-term observation, using a scan mirror of the spectrometer, (ii) sampling energy returned from the Moon during each period, and (iii) integrating the sampled energy over the multiple periods.

The step of determining includes autocorrelating the sampled energy to determine whether the integrated sampled energy has changed by a delta amount.

Another embodiment of the present invention is a method of calibrating a spectrometer, while orbiting the Earth. The method includes the steps of:

(a) determining a period of time in which the Moon is within a field of view (FOV) of the spectrometer;

(b) measuring radiance from the Moon during the period of time; and (c) calibrating the spectrometer using the measured radiance from the Moon.

Measuring the radiance in step (b) includes filtering the radiance from the Moon using the following equation:

$$F_k = \int_0^{2\pi} \left[ \frac{V_k(\theta(t), \phi(t))}{\Delta\Omega(t)\cos\theta(t)} \right] d\Omega$$

where $$\Delta\Omega(t) = 2\pi\left(1 - \sqrt{1 - \frac{R_{eq}R_{pol}}{D_{sb}^2(t)}}\right) \quad (5)$$

and $V_k$ is the signal from detector k, at wavelength $\lambda_k$, which varies in time, as a function of elevation and azimuth angles to the celestial body with respect to the satellite, $R_{eq}$ and $R_{pol}$ is the equatorial and polar radii of the celestial body, respectively, and $D_{sb}$ (t) is the distance between the satellite and the celestial body.

Yet another embodiment of the present invention is a program for executing instructions uploaded to a spectrometer orbiting the Earth. The program executes the following steps:

(a) stopping imaging of the Earth;
(b) imaging the Moon for a period of time; and
(c) measuring radiance from the Moon during the period of time.

The program includes the following step:

(d) imaging the Earth, after the period of time. The period of time may include multiple periods of time.

It is understood that the foregoing general description and the following detailed description are exemplary, but are not restrictive, of the invention.

BRIEF DESCRIPTION OF THE DRAWINGS

The present invention may be understood from the following description when read in connection with the accompanying figures:

FIG. 1B is a functional view of the azimuth and elevation angles provided of a lunar raster scan by the CERES instrument shown in FIG. 1a.

DETAILED DESCRIPTION OF THE INVENTION

In U.S. patent application Ser. No. 12/542,885 (now issued as U.S. Pat. No. 8,258,449) filed by the inventor of the present application, a description of the Clouds and the Earth's Radiant Energy System (CERES) is provided. As described therein, CERES is a satellite which includes instruments (radiometers) for monitoring global Earth radiation budget (ERB) parameters from space. The CERES radiometers also view the Moon. The CERES field-of-view (FOV), however, is approximately ten times larger than the extent of the lunar disk seen from a low earth orbit. In addition, each CERES detector in the radiometers has a non-uniform spatial response within its FOV. This complicates attempts to measure absolute lunar radiance directly, as is done for the ERB parameters.

When the CERES telescope is oriented to view the Moon, the lunar radiance fills only 10% of the PSF. Such extreme under-filling of the CERES FOV and lack of an accurate known point spread function (PSF) shape, $P(\theta,\phi)$, adds complications to any attempt to derive lunar radiance from a CERES raster scan across the Moon.

It will be appreciated that the Moon has an average reflectivity, or albedo of the entire lunar surface, which is believed to remain constant at a level better than $10^{-8}$% per decade. Monthly views of the Moon, thus, allow space based photodiode gains on the SeaWIFS instrument to be adjusted, yielding good stability to its earth observation measurements. An accurate figure of broadband lunar albedo, however, has never been measured from space using SeaWIFS. This is because its photodiodes are narrowband detectors and cannot be used to estimate broadband albedo with high accuracy.

Also described in the aforementioned application is a system and method for mapping the PSF shapes, $P(\theta,\phi)$, of the CERES instruments, when performing raster scans of the Moon; and using the data to measure the Moon's radiant output.

Figure 1A:
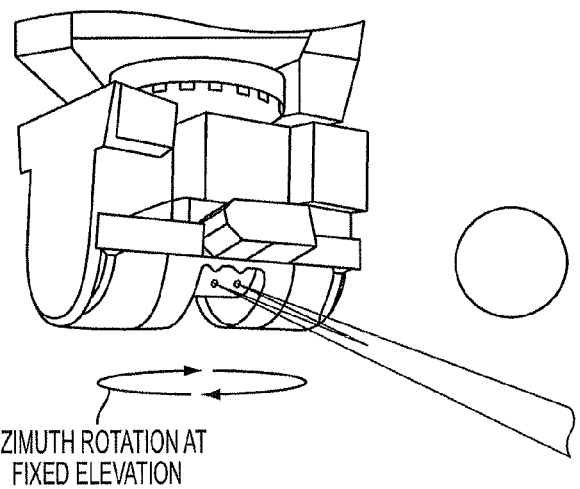
FIG. 1A is a perspective view of a radiometer orbiting the Earth having azimuth and elevation scanning capability, in which the exemplary radiometer is the Clouds and the Earth's Radiant Energy System (CERES).

For purposes of mapping the PSF shapes, $P(\theta,\phi)$, the CERES instruments perform regular raster scans of the Moon. The elevation scan head of the CERES instruments is held fixed, while the azimuth of the instruments are rotated back and forth. In this manner, the Moon zigzags through the telescope's FOV, as shown in FIG. 1a.

The inventor derives Eqn. 1 as a representation of an integral of the CERES lunar raster scan data over all angular space:

$$F_m = \int_0^{2\pi} V_m(\theta^m, \phi^m) d\Omega \quad (1)$$

where $V_m$ is the detector output from the raster scan data of the Moon, $\theta,\phi$ are elevation and azimuth angles, respectively, and $F_m$ represents the integral of the raster scan data of the detector over the angular space.

When the integration of Eqn. 1 is performed on the CERES detector output during a lunar raster scan, the result is the radiometric gain G multiplied by the disk integrated filtered radiance from the Moon (as in Eqn. 2, below).

$$F_m = G\int_0^{2\pi} M(\theta,\phi) d\Omega \quad (2)$$

where $M(\theta,\phi)$ is the filtered lunar radiance.

If $R_{eq}$ and $R_{pol}$ are the equatorial and polar radii of the Moon (1738.14 km and 1735.97 km), respectively, and $D_{sm}$ is the distance between the satellite and the Moon, then the equation below provides the angular extent of the Moon, as follows:

$$\Delta\Omega_m = 2\pi\left(1 - \left(1 - \frac{R_{eq}R_{pol}}{D_{sm}^2}\right)^{\frac{1}{2}}\right) \quad (3)$$

Equation 3 may be used to provide the mean filtered radiance K leaving the lunar disk, as follows:

$$K = \frac{F_m}{G \times \Delta\Omega_m} \quad (4)$$

Note that the angular size of the Moon is taken outside of the integral in Equation 1 and used in Equation 4, by assuming little, or no change in the CERES satellite to Moon distance in the time of the measurement.

Next, a filtering factor, $f_i$, may be defined using the spectral response for a particular scene, i, (for example, the Earth, or Moon) as follows:

$$f_i = \frac{\int_0^{200} r(\lambda)L^i(\lambda)d\lambda}{\int_0^{200} L^i(\lambda)d\lambda} \quad (5)$$

where $r(\lambda)$ is the spectral response of a CERES channel that provides the fraction of incident radiance at a wavelength $\lambda$, which is converted into heat energy within the detector, and is integrated between 0 and 200 microns, and $L^i(\lambda)$ is the radiance from the particular scene, i, at the wavelength $\lambda$.

It will be appreciated that the numerator of Equation 5 is the filtered radiance of the particular scene, i, obtained from the CERES channel, i.e., the integral of the reflected lunar spectrum and the CERES instrument spectral response. This may also be expressed as the value K in Equation 4. The denominator of Equation 5 is the integral of the reflected lunar spectrum across all wavelengths.

As described in the aforementioned US Application, the average radiance from a celestial body (for example, the Moon) is measured by raster scanning the celestial body using a pre-calibrated instrument. Thus, the radiance from the Moon, $L^{lun}$, is measured across all the wavelengths, providing the denominator of Equation 5. Thus, $L^{lun}$ may be expressed as:

$L^i = K/f_i$ for a scene i, or $L^{lun} = K/f_{lun}$ for a lunar scene. (5A)

The filtering factor, $f_{lun}$, may be estimated using the ROLO model (see below) estimates of the lunar spectrum in Equation 5.

The USGS Robotic Lunar Observatory (ROLO) has made daily measurements from the Arizona desert of the solar spectral irradiance scattered from the Moon. This allowed construction of a database model that gives the spectrally resolved albedo of the Moon for all phase/libration angles.

Figure 1B:
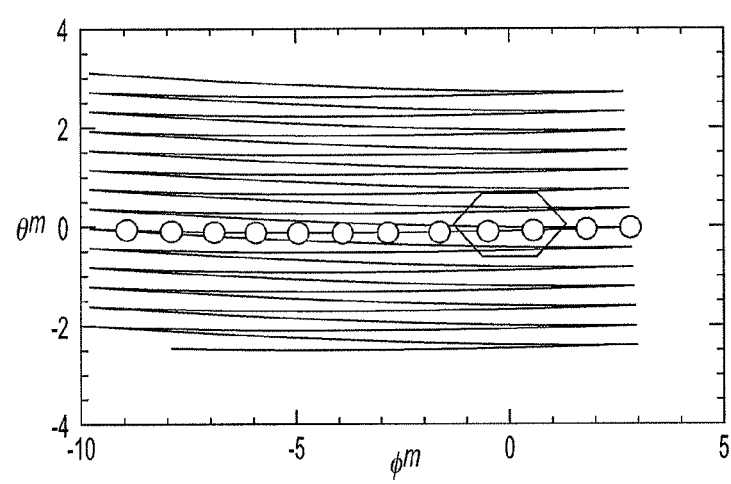
Figure 1C:
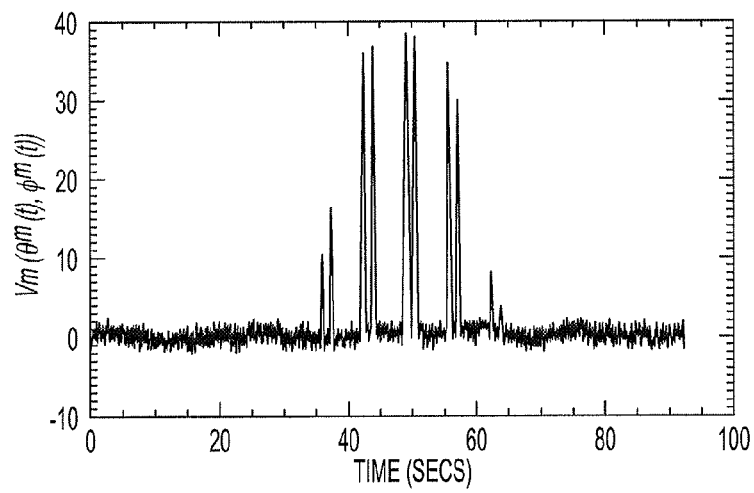
FIG. 1C is an exemplary signal output of a short wave (SW) detector in the CERES instrument during its lunar raster scan shown in FIG. 1b.

FIG. 1B shows a CERES telescope performing a raster scan of the Moon. The telescope is fixed in elevation and rotating, back and forth, in azimuth in the raster scan mode. The CERES FOV is 1.3°×2.6° in order to obtain a 25 km sized footprint, when viewing the earth at nadir (90 degrees elevation). The figure shows the raster scan of the Moon, as CERES is orbiting the earth. It will be appreciated that the elevation angle is changing, because of the CERES orbit around the earth. The telescope's FOV is shown in the enclosed highlighted area. FIG. 1C shows an example of the radiometric output from the CERES SW detector during a lunar raster scan.

It will be appreciated that the Moon has been used by space based earth observing instruments, such as the SeaWIFS radiometer, as a radiative target to maintain calibration stability. The average reflectivity, or albedo of the entire lunar surface is believed to remain constant at a level better than $10^{-8}\%$ per decade.

Figure 2:
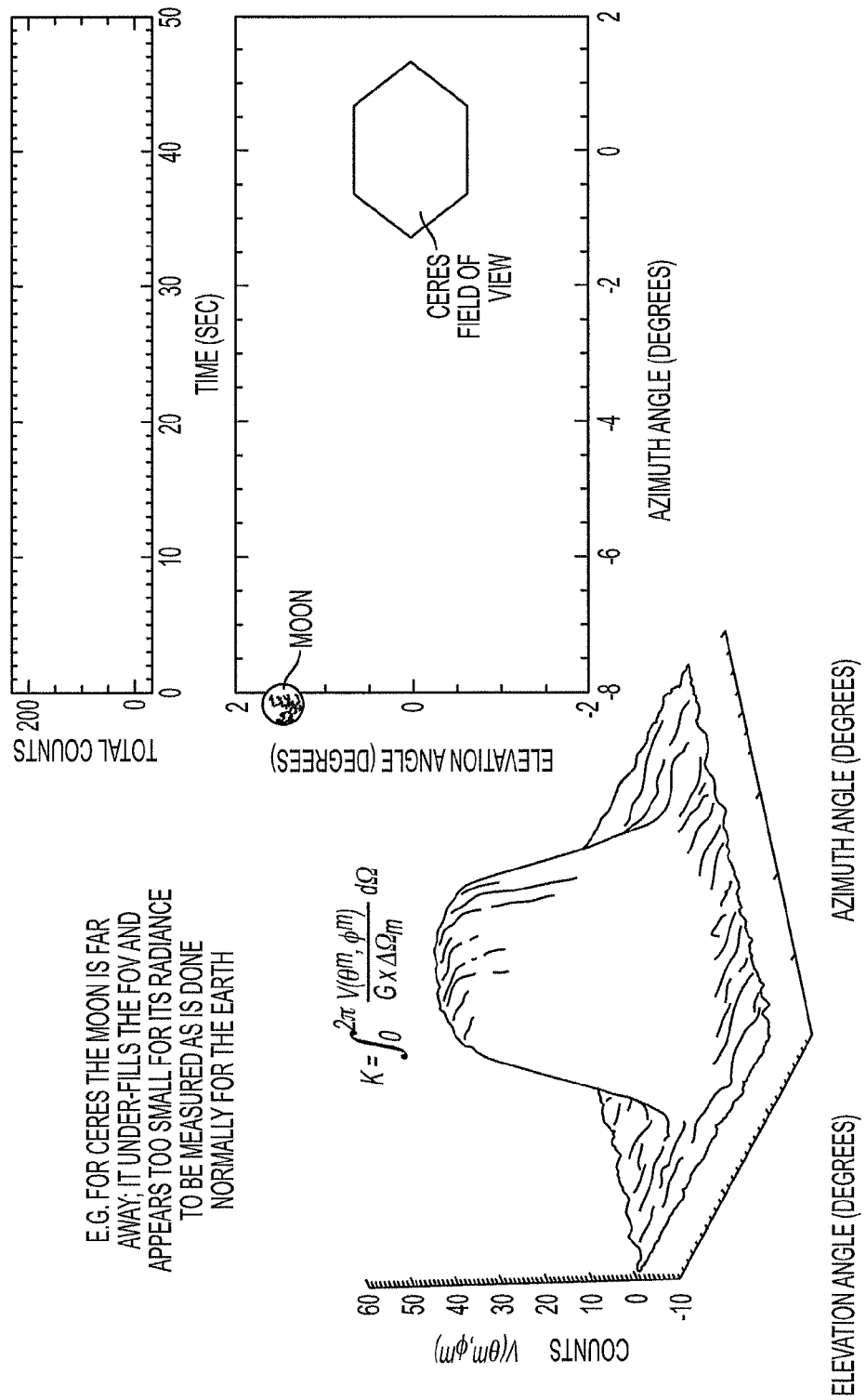
FIG. 2 is a pictorial of the Moon and the CERES field of view (FOV), in which the Moon under fills the FOV. Also shown are interferogram counts of the radiance observed by the CERES instrument upon viewing of the Moon.

FIG. 2 shows another view of CERES' field of view (FOV) compared to the size of the Moon. The radiance from the Moon appears too small to be measured. The aforementioned US application, however, describes a method form measuring the average lunar radiance from an Earth's orbit using raster scan data.

Several instruments have been built and are presently orbiting the Earth, such as the Cross-track Infra-red Scanner (CrIS) on the National Polar-orbiting Operational Environmental Satellite System (NPOESS) Preparatory Project (NPP). The CrIS was recently launched and measures the infra-red output from the Earth using a Fourier Transform Spectrometer (FTS). Another instrument is the AQUA.

Figure 3:
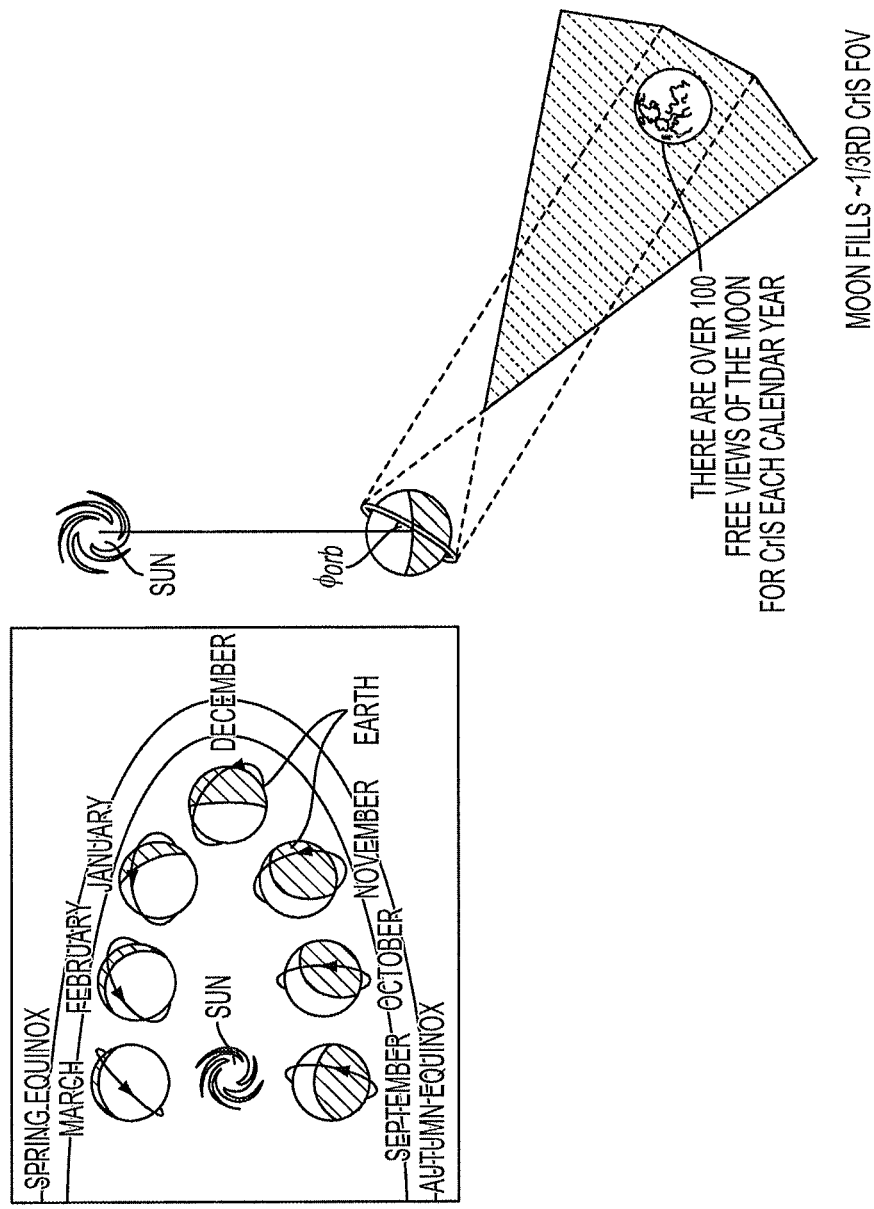
FIG. 3 shows "free views" of the MOON available to the CrIS instrument each calendar year.

The inventor discovered that all existing sun-synchronous satellites, like CrIS and AQUA, can see the Moon when their space views drift through a triangular region, as shown in FIG. 3. As shown, there are over 100 views of the Moon for CrIS each calendar year. As an example, the inventor calculated that on Nov. 23, 2012 at 19.07 UTC, the Moon at 40° phase angle would be in the field of view (FOV) of CrIS. The Moon would fill about a third of the FOV. The inventor calls this a "free view", because the Moon will be in just the right orientation, so that it may be seen by the CrIS instrument on NPP in its space look.

Figure 4:
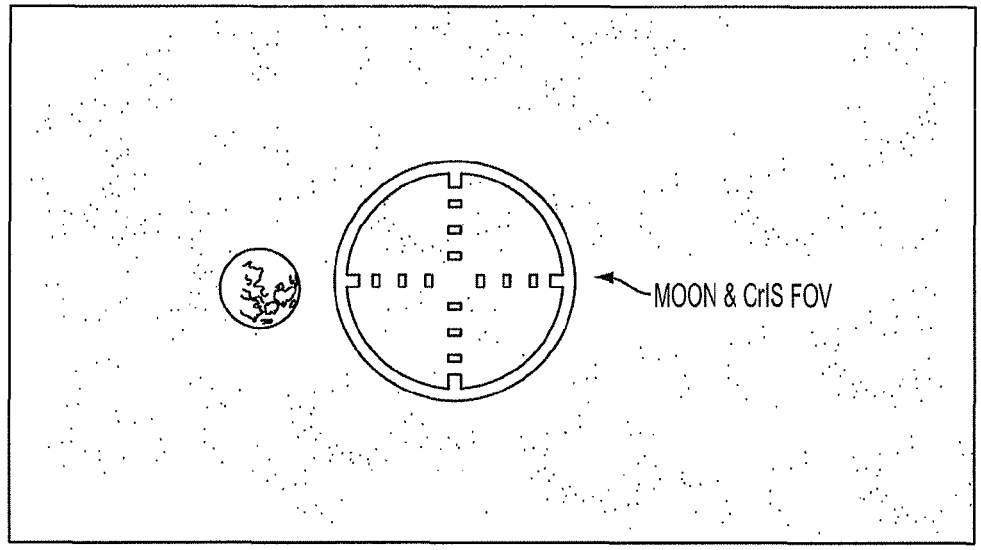
FIG. 4 depicts the Moon about to go through the center of the CrIS FOV at a predetermined time.

The relationship between the FOV of CrIS and the Moon is shown in FIG. 4 at 19.07 UTC on Nov. 23, 2012.

Figure 5:
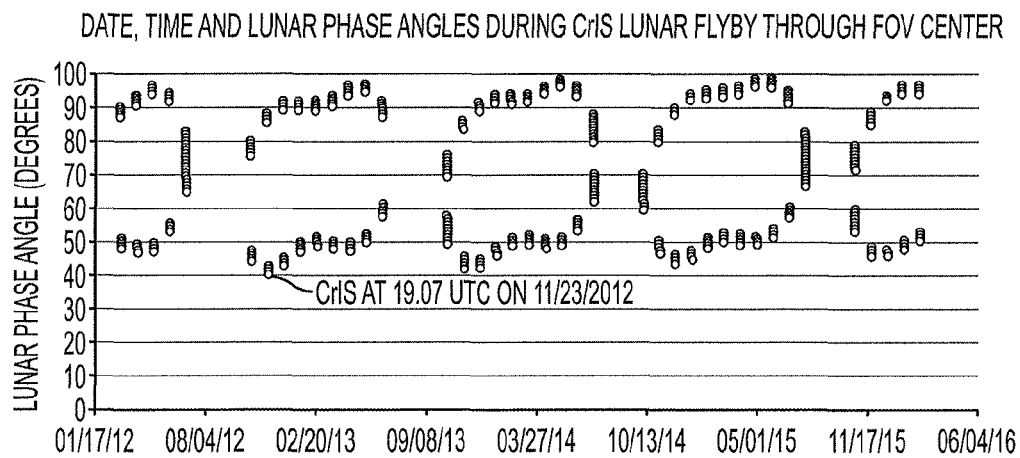
FIG. 5 shows multiple and repeatable "free views" available to the CrIS instrument during various times of the year.

FIG. 5 shows that the center of the FOV CrIS would fly through the Moon over 100 times each calendar year. These "free views" are repeatable and may be mathematically structured so that the infra-red lunar output may be modeled. As shown, in FIG. 5, the lowest phase angle is 40° and the highest phase angle is 99°. The lunar phase angle, thus, ranges from 40° to 99°. The pattern of the phase change through the year is very repeatable. Therefore, modeling of the IR radiance from the Moon may be performed.

Figure 6A:
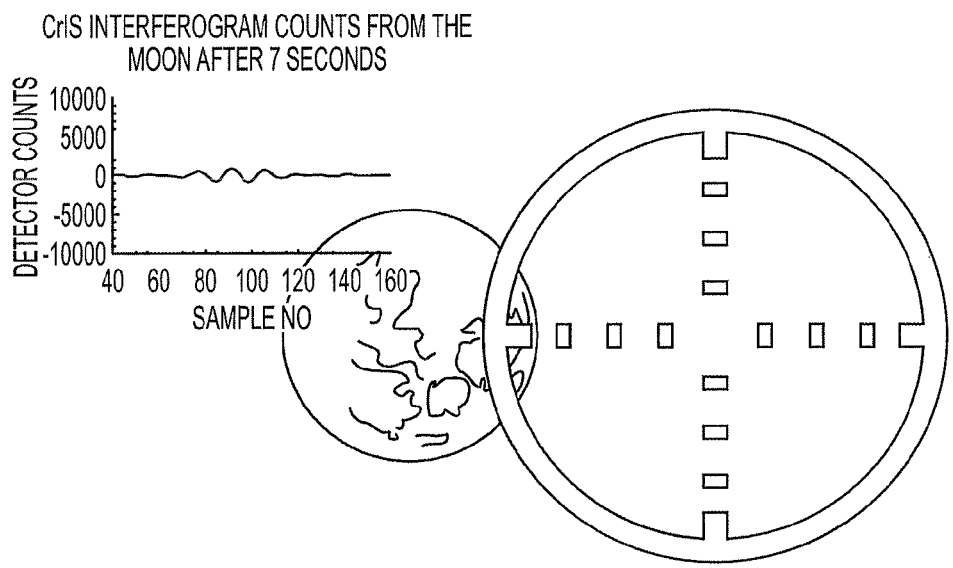
FIGS. 6A and 6B show the Moon passing through the center of the FOV of the CrIS instrument and the interferogram counts changing in intensity.
Figure 6B:
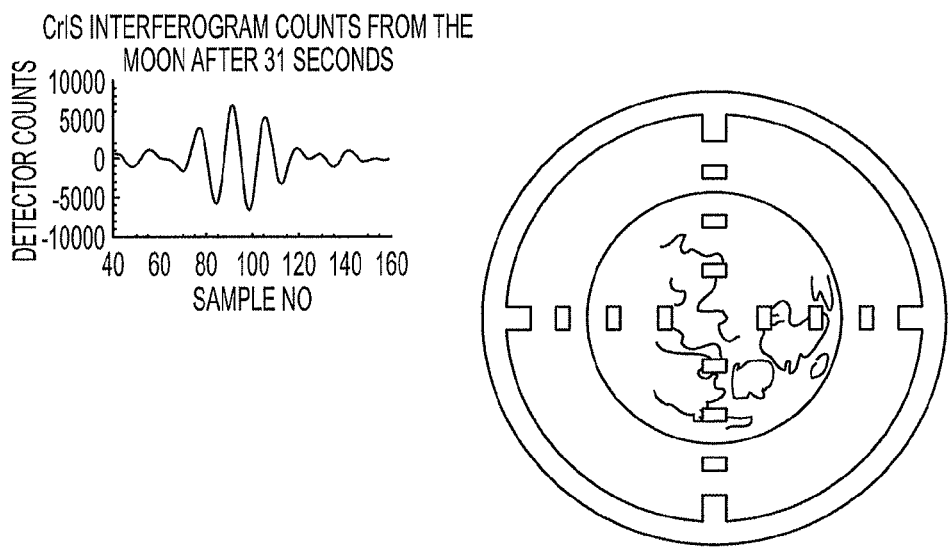

If the mirror of the FTS interferometer in CrIS is stopped from rotating, just prior each "free view", so that the Moon may drift through the very center of the mirror's FOV, as pictured in FIGS. 6A and 6B, it may allow tracking (viewing) the Moon for approximately 60 seconds. This may be repeated 100 times per calendar year.

As shown, in FIG. 6A, the interferogram counts from the Moon (shown as a sinusoidal signal) are increasing and detectable after 7 seconds of stopping the FTS (Fourier Transform Spectrometer) mirror. As shown in FIG. 6B, the interferogram counts from the Moon are at their maximum intensity. This occurs after 31 seconds of stopping the FTS mirror, as the Moon drifts through the center of the mirror's FOV. The size of the interferoram is significant, due to the high thermal IR flux output of the Moon (approximately 1000 W/m2 as measured by CERES when fully illuminated).

Figure 7:
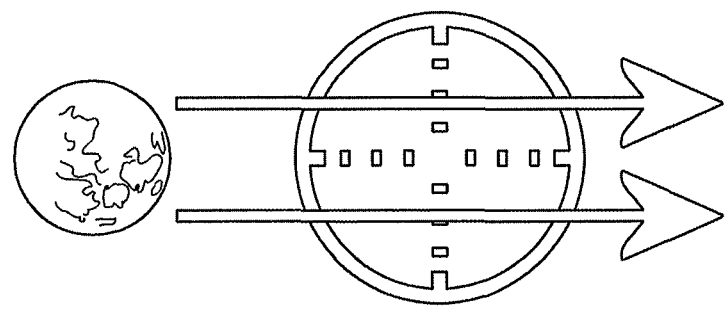
FIG. 7 depicts stopping the CrIS mirror at a pre-calculated angle and predetermined time period, as the Moon is allowed to drift through the FOV center of the mirror, in accordance with an embodiment of the present invention.

Accordingly, an embodiment of the present invention is shown in FIG. 7. As shown, the CrIS mirror is stopped at a pre-calculated angle and pre-calculated time, so that the Moon is allowed to drift through the FOV center of the instrument. Intensity data of the Moon is downloaded from the instrument for 30 to 60 seconds. This provides 150 to 300 samples of interferogram counts. The intensity data is then integrated in one-dimensional (1D) angular space.

The actual calculation of the lunar radiance is done using the integral method disclosed in U.S. patent application Ser. No. 12/542,885, which is incorporated herein by reference in its entirety. Instead of performing a two-dimensional (2D) integration, however, the present invention performs a 1D integration, which is simpler. Sufficient samples are available above the noise level, as the lunar IR flux, even at a phase angle of around 40°, still exceeds 1000 w/m$^2$ in some places.

The present invention may be applied not only to CrIS, but also to the AVHRR instruments (http://en.wikipedia.org/wiki/AVHRR), and sounders such as AIRS (on Aqua http://en.wikipedia.org/wiki/Atmospheric_Infrared_Sounder), IASI (http://www.class.ncdc.noaa.gov/saa/products/search?datatype_family=IASI) and SCHIAMACHY (https://earth.esa.int/web/guest/missions/esa-operational-eo-missions/envisat/instruments/sciamachy both are ESA).

It will be appreciated that the lunar IR flux provides a signal comparable to an internal calibration target (ICT) residing in a satellite. The lunar IR flux may be used to calibrate the on-board sensor or sounder and meet the precision and accuracy required in monitoring the long term changes in the Earth's albedo.

In another embodiment of the present invention, the sounder scans the Moon at a predetermined time to measure the lunar albedo. For example, CrIS includes a 360° scan that must last for 8 seconds, as shown in FIG. 8B. As shown, the mirror spends 1.5 seconds going from ICT to 67 degrees, then 6 seconds performing 30 0.2 degree (0.2 sec) steps across the Moon up to 73 degrees, where it takes 0.5 seconds to return to ICT. This may be repeated 8 times to give approximately 16 valid moon measurements.

Figure 8A:
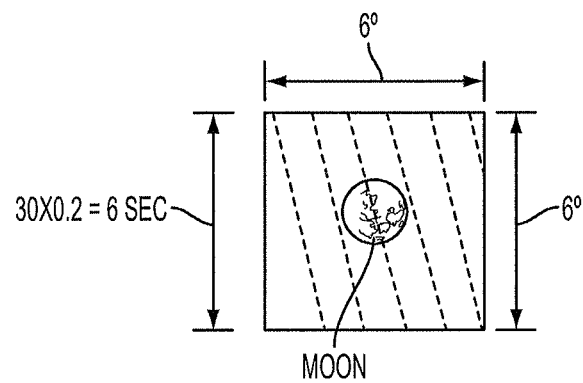
FIG. 8A illustrates a view of the Moon within a 6×6 degrees grid of the CrIS instrument.
Figure 8B:
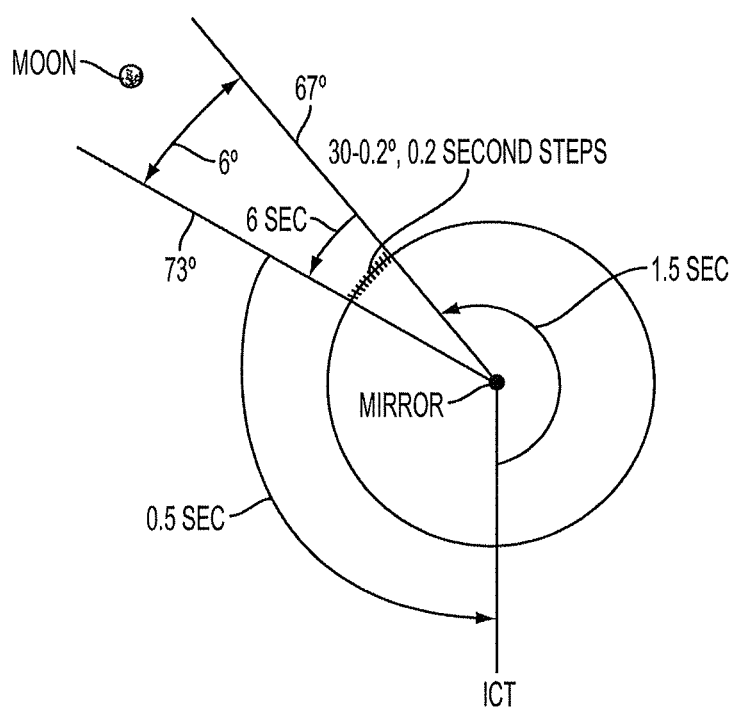
FIG. 8B illustrates another embodiment of the present invention showing the mirror of the CrIS instrument taking an 8 second, one-directional scan, in which 30-0.2 degree steps at 0.2 seconds are taken of the Moon, in accordance with an embodiment of the present invention.

The Moon appears in CrIS' space look around 20 times per month for a period of 60 second each time, in a 6×6 degrees grid, as shown if FIG. 8A. During the 60 seconds, there is approximately 8 scans of the Moon.

To perform the Moon scan from ICT to 67°, and then from 67° to 73° in 30 steps, and then finally back to ICT, a new EEPROM may be up loaded into the instrument.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of calibrating a spectrometer orbiting the Earth, the method comprising the steps of:
    imaging the Earth, using the spectrometer, for long-term observations of the Earth's albedo;
    imaging the Moon by raster scanning the Moon during multiple periods using a scan mirror of the spectrometer, wherein each period provides a short-term observation of the Moon;
    sampling energy returned from the Moon during each period from raster scan data obtained during each period of the multiple periods;
    integrating the sampled energy over the multiple periods;
    autocorrelating the sampled energy; and
    when the results of the autocorrelation of the sampled energy indicate that the integrated sampled energy has changed over the multiple periods by a delta amount, calibrating the spectrometer using the delta amount determined based on the autocorrelation.

2. The method of claim 1 wherein periodically imaging the Moon includes:
    determining a period of time during which the Moon is viewable by the spectrometer.

3. The method of claim 2 wherein
the period of time is determined by personnel on the Earth.

4. The method of claim 2 including the step of:
    uploading a program to the spectrometer to execute a command to image the moon.

5. The method of claim 1, wherein the step of integrating includes:
    integrating the sampled energy over a period of less than ten years.

6. The method of claim 1, further comprising the step of:
    when the results of the autocorrelation of the sampled energy indicate that the integrated sampled energy has not changed over the multiple periods by the delta amount, concluding that the spectrometer does not require calibration.

7. The method of claim 1 wherein imaging the Moon occurs when the Moon passes within a field-of-view of the mirror during each of the multiple periods.

8. The method of claim 1, wherein prior to imaging the Moon, determining that the Moon will pass within a field-of-view of the mirror during each of the multiple periods.

9. A method of calibrating a spectrometer, while orbiting the Earth, comprising the steps of:
    determining a period of time in which the Moon is within a field of view (FOV) of a detector of the spectrometer;
    measuring radiance from the Moon during the period of time that the Moon is within the field of view (FOV) of the detector of the spectrometer;
    filtering the measured radiance from the Moon based on elevation and azimuth angles to the moon with respect to a satellite containing the spectrometer; and
    calibrating the spectrometer using the filtered radiance from the Moon.

10. The method of claim 9 wherein the
filtering of the radiance from the Moon uses the following equation:

$$F_k = \int_0^{2\pi} \left[ \frac{V_k(\theta(t), \phi(t))}{\Delta\Omega(t)\cos\theta(t)} \right] d\Omega$$

where $$\Delta\Omega(t) = 2\pi\left(1 - \sqrt{1 - \frac{R_{eq}R_{pol}}{D_{sb}^2(t)}}\right)$$

and
    $V_k$ is the signal from the detector k, at wavelength $\lambda_k$, which varies in time, as a function of elevation and azimuth angles to the Moon with respect to the satellite,
    $R_{eq}$ and $R_{pol}$ is the equatorial and polar radii of the Moon, respectively, and
    $D_{sb}(t)$ is the distance between the satellite and the Moon.

11. The method of claim 10 wherein the filtering is performed in a one dimensional (1D) space.

12. The method of claim 9 further including a step of:
    uploading a program to the spectrometer to begin measuring the radiance from the Moon.

13. The method of claim 9 wherein
the period of time includes multiple periods of time in which the Moon is within the FOV of the spectrometer.

14. The method of claim 9 including the step of:
positioning a mirror of the spectrometer to allow the Moon to pass within the FOV of the mirror.

* * * * *